US011483275B1

(12) United States Patent
Warner

(10) Patent No.: US 11,483,275 B1
(45) Date of Patent: Oct. 25, 2022

(54) CHALLENGE INTERFACE AND ACCESS CONTROLS FOR SOCIAL NETWORK CHALLENGES

(71) Applicant: Meta Platforms, Inc., Menlo Park, CA (US)

(72) Inventor: Kathleen Warner, San Francisco, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/868,727

(22) Filed: May 7, 2020

(51) Int. Cl.
*H04L 51/52* (2022.01)
*G06F 3/048* (2013.01)
*G06Q 50/00* (2012.01)
*G06F 3/0482* (2013.01)

(52) U.S. Cl.
CPC ............. *H04L 51/52* (2022.05); *G06F 3/048* (2013.01); *G06F 3/0482* (2013.01); *G06Q 50/01* (2013.01)

(58) Field of Classification Search
CPC ....... H04L 51/32; G06F 3/0482; G06F 3/048; G06Q 50/01
See application file for complete search history.

(56) References Cited

U.S. PATENT DOCUMENTS

| 2014/0047045 | A1* | 2/2014 | Baldwin | H04L 51/32 |
| | | | | 709/206 |
| 2014/0280542 | A1* | 9/2014 | Pridmore | A63F 13/00 |
| | | | | 709/204 |
| 2015/0182861 | A1* | 7/2015 | Winter | G06F 16/743 |
| | | | | 705/14.14 |
| 2016/0378998 | A1* | 12/2016 | Brintalos | G06F 21/602 |
| | | | | 380/278 |
| 2017/0103352 | A1* | 4/2017 | Kurjanowicz | G06Q 50/01 |
| 2019/0080427 | A1* | 3/2019 | Lippert | G07F 17/323 |
| 2020/0065853 | A1* | 2/2020 | Cvinar | H04N 21/4781 |
| 2020/0175187 | A1* | 6/2020 | Buckley | G06Q 10/10 |

FOREIGN PATENT DOCUMENTS

WO  WO-02075614 A1 * 9/2002 ......... G06F 16/9535

* cited by examiner

*Primary Examiner* — Roberto Borja
(74) *Attorney, Agent, or Firm* — Fenwick & West LLP

(57) ABSTRACT

A social networking system provides a user interface for a user to create, share, and participate in challenges. A challenge includes a challenge prompt. The challenge prompt instructs a challenge recipient to perform an action, such as to record a video or capture an image. A challenge creator sets parameters for the challenge, such as the challenge prompt, a challenge duration, available formats for challenge responses, challenge permissions, etc. Upon creation of the challenge, the social networking system distributes the challenge to other users of the social networking system. After a user submits a response to the challenge, or after expiration of the challenge duration, the user may view the challenge responses submitted by other users.

18 Claims, 4 Drawing Sheets

CHALLENGE INTERFACE AND ACCESS CONTROLS FOR SOCIAL NETWORK CHALLENGES

BACKGROUND

This disclosure relates generally to social networking systems, and more specifically to challenges in social networking systems.

Challenges may be intended to raise awareness of an issue, raise money for a cause, or provide entertainment. For example, the "ice bucket challenge" raised awareness of amyotrophic lateral sclerosis (ALS). Participants in the ice bucket challenge would capture videos of a person receiving a bucket of ice water dumped over their head. Videos of individuals or groups completing challenges are often posted to video sharing platforms, where the videos may be publicly accessible. In some cases, individuals may transmit challenges or videos of completed challenges directly to other individuals, such as via a text message.

SUMMARY

A social networking system provides a user interface for a user to create, share, and participate in challenges. A challenge includes a challenge prompt. The challenge prompt instructs a challenge recipient to perform an action, such as to record a video or capture an image. A challenge creator sets parameters for the challenge, such as the challenge prompt, a challenge duration, available formats for challenge responses, challenge permissions, etc. Upon creation of the challenge, the social networking system distributes the challenge to other users of the social networking system. After a user submits a response to the challenge, or after expiration of the challenge duration, the user may view the challenge responses submitted by other users.

In some embodiments, a method may comprise generating a challenge creation interface. The challenge creation interface allows a user to create a challenge and challenge other users. The method may comprise receiving challenge parameters via the challenge creation interface. The challenge parameters may comprise a challenge prompt, a challenge duration, and an identification of users being challenged. The method may comprise creating a challenge record comprising the challenge parameters. The challenge record may be stored in a challenge store. The method may comprise transmitting a challenge response interface to a challenged user. The challenge response interface is configured to prompt a user to submit a response to the challenge. The method may comprise receiving a challenge response via the challenge response interface. The response may comprise a text, image, or video response to the challenge prompt. The method may comprise displaying a plurality of challenge responses including the challenge response. The challenge responses may be displayed via the challenge response interface. The challenge responses may be displayed in response to the user submitting a response to the challenge.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A social networking system provides a user interface for a user to create, share, and participate in challenges. A challenge includes a challenge prompt. The challenge prompt instructs a challenge recipient to perform an action, such as to record a video or capture an image. A challenge creator sets parameters for the challenge, such as the challenge prompt, an expiration time of the challenge, available formats for challenge responses, challenge permissions, etc. Upon creation of the challenge, the social networking system distributes the challenge to other users of the social networking system. After a user submits a response to the challenge, or after expiration of the challenge duration, the user may view the challenge responses submitted by other users. The challenge creation interfaces and challenge response interfaces described herein allow users to easily create and share challenges, as well as to control who has access to the challenges.

System Architecture

Figure 1:
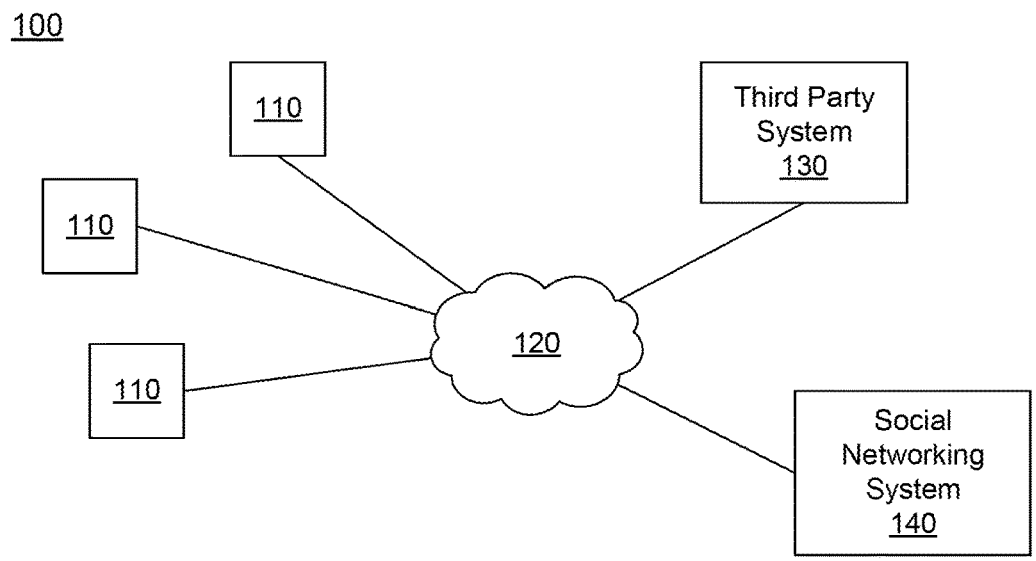
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
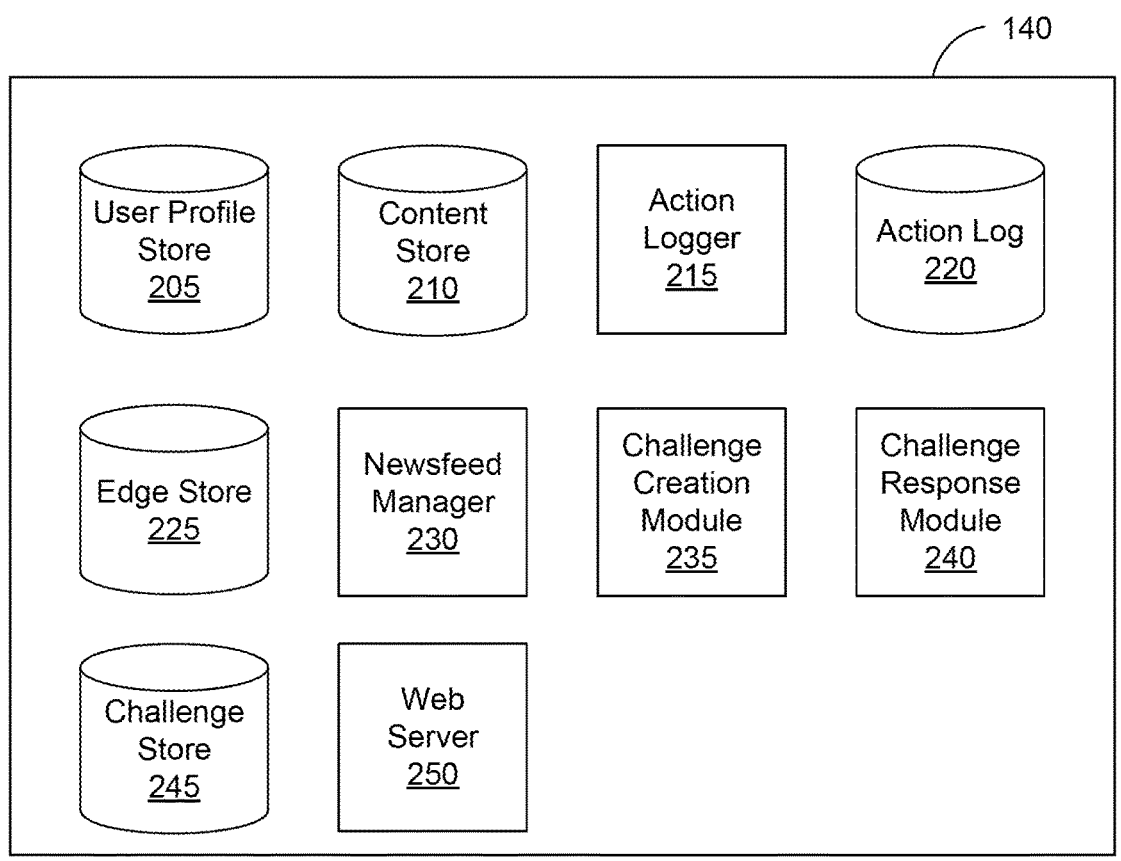
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a newsfeed manager 230, a challenge creation module 235, a challenge response module 240, a challenge store 245, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a challenge record, a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include creating a challenge, submitting a response to a challenge, adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the online system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 230 may generate stories for presentation to a user based on information in the action log 220 and in the edge store 225 or may select candidate stories included in the content store 210. One or more of the candidate stories are selected and presented to a user by the newsfeed manager 230.

For example, the newsfeed manager 230 receives a request to present one or more stories to an online system user. The newsfeed manager 230 accesses one or more of the user profile store 205, the content store 210, the action log 220, and the edge store 225 to retrieve information about the identified user. For example, stories or other data associated with users connected to the identified user are retrieved. The retrieved stories or other data are analyzed by the newsfeed manager 230 to identify candidate content items, which include content having at least a threshold likelihood of being relevant to the user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user.

In various embodiments, the newsfeed manager 230 presents stories to a user through a newsfeed including a plurality of stories selected for presentation to the user. The newsfeed may include a limited number of stories or may include a complete set of candidate stories. The number of stories included in a newsfeed may be determined in part by a user preference included in user profile store 205. The newsfeed manager 230 may also determine the order in which selected stories are presented via the newsfeed. For example, the newsfeed manager 230 determines that a user has a highest affinity for a specific user and increases the number of stories in the newsfeed associated with the specific user or modifies the positions in the newsfeed where stories associated with the specific user are presented.

The newsfeed manager 230 may also account for actions by a user indicating a preference for types of stories and selects stories having the same, or similar, types for inclusion in the newsfeed. Additionally, the newsfeed manager 230 may analyze stories received by the online system 140 from various users to obtain information about user preferences or actions from the analyzed stories. This information may be used to refine subsequent selection of stories for newsfeeds presented to various users.

The challenge creation module 235 is configured to generate a challenge creation interface. The challenge creation module 235 may comprise one or more processors configured to perform the described actions. The challenge creation interface prompts a user to create a new challenge. A user who creates a challenge may be referred to herein as a "challenger" or a "challenge creator." The challenge creation module 235 receives challenge parameters from a challenger and creates a challenge record comprising the parameters. The challenge creation module 235 stores the challenge record in the challenge store 245.

The challenge response module 240 is configured to generate a challenge response interface. The challenge response module 240 may comprise one or more processors configured to perform the described actions. The challenge response interface presents a user with a challenge prompt for a challenge record in the challenge store 245. A user who receives a challenge may be referred to herein as a "challengee." The challenge response interface provide a user with the ability to submit a response to the challenge prompt. A user who submits a response to a challenge may be referred to herein as a "challenge responder." The challenge response module 240 provides the challenge response interface to the newsfeed manager 230 for presentation in a newsfeed. The challenge response module 240 stores responses to the challenge prompt in the challenge store 245. The challenge response module 240 provides the responses to the newsfeed manager for presentation via the challenge response interface in the newsfeed.

In various embodiments, the newsfeed manager 230 presents a challenge response interface to a user through a newsfeed for an in-progress challenge. The newsfeed manager 230 identifies a challenge record in the challenge store 245 that identifies the user as a challengee. The newsfeed manager 230 retrieves a challenge response interface from the challenge response module 240 and creates a content item comprising the challenge response interface for presentation in the newsfeed. The user may submit a response to the challenge via the challenge response interface in the newsfeed.

In various embodiments, the newsfeed manager 230 identifies a challenge record for a completed challenge in the challenge store 245 that is relevant to the user. The user may or may not have submitted a challenge response for the completed challenge. The newsfeed manager 230 retrieves challenge responses from the challenge response module 240 and creates a content item comprising the challenge response interface for presentation in the newsfeed. The user may view responses to the completed challenge via the challenge response interface in the newsfeed.

The challenge store 245 is configured to store challenge records and challenge responses. The challenge store 245 may comprise one or more databases. In some embodiments, the challenge store 245 may be a subcomponent of the content store 210. The challenge records comprise parameters for a challenge. The challenge responses comprise digital content submitted by users who respond to the challenge. The challenge record also comprises access permissions for users to view challenge responses. In response to a request from a user to view challenge responses, the social networking system 140 may refer to the access permissions in the challenge store 245 to determine whether the user may view the challenge responses.

The web server 250 links the online system 140 via the network 120 to the one or more client devices 110, as well as to the one or more third party systems 130. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as IOS®, ANDROID™, or BlackberryOS.

Challenge Generation and Distribution

Figure 3:
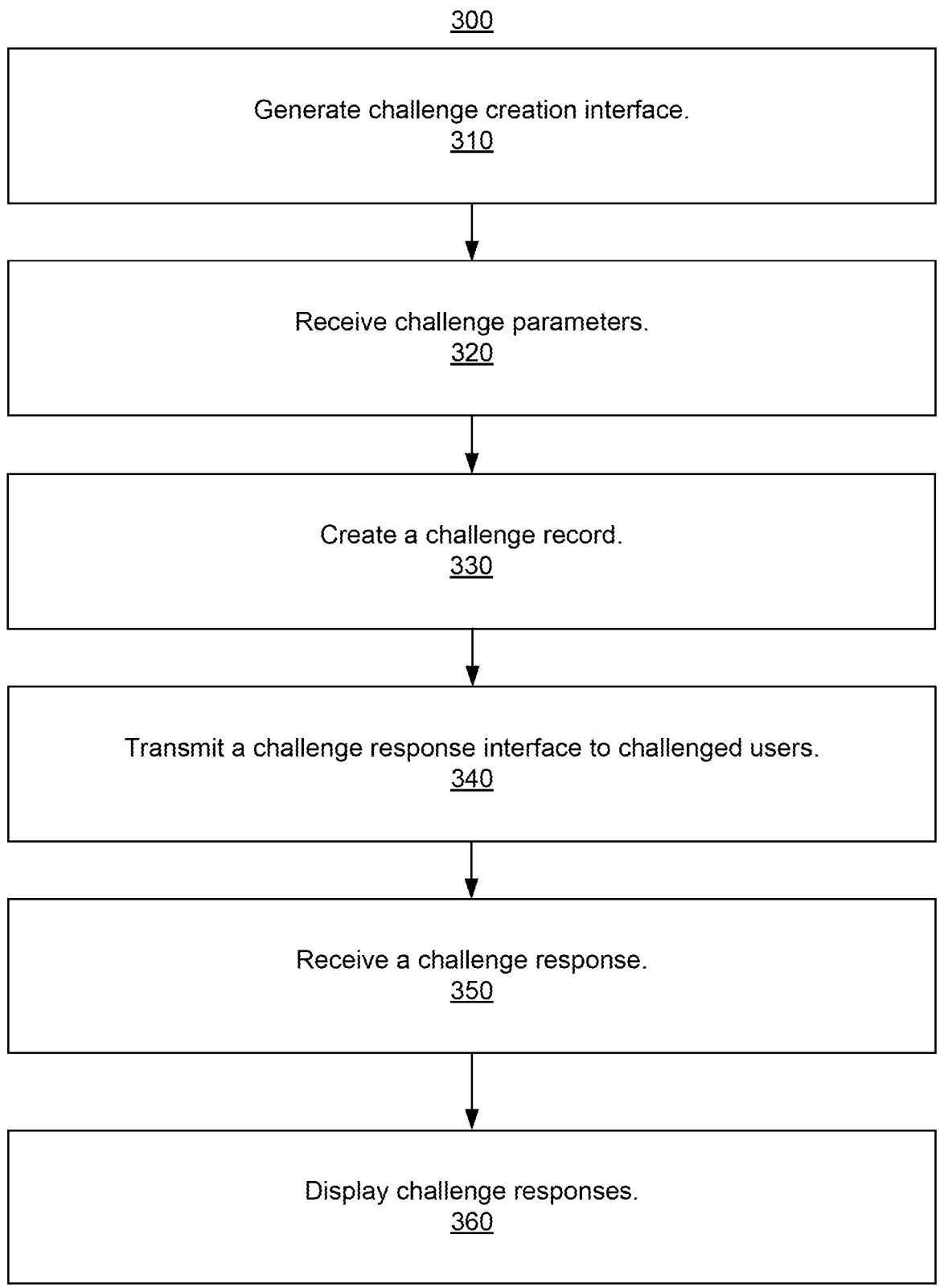
FIG. 3 is a flowchart of a method for distributing a challenge, in accordance with an embodiment.

FIG. 3 illustrates a method for distributing a challenge, in accordance with one or more embodiments. A system (e.g. the social networking system 140 of FIG. 2) generates 310 a challenge creation interface for presentation to a user of the system. The challenge creation interface comprises an option to create a challenge.

In some embodiments, the challenge creation interface suggests one or more trending challenges for the user. For example, the challenges may be suggested based on a number of users creating the challenge, a number of users completing the challenge, a percentage of users completing the challenge, or some combination thereof.

In some embodiments, the challenge creation interface prompts the user to create a new challenge. The user may create a challenge prompt for the challenge. For example, the user may type a challenge prompt, such as, "Do your best impression of your dog." The user may select available formats for the response, such as text, audio, photo, video, some combination thereof, or the user may allow challenge responders to use any format desired by the challenge responder.

In some embodiments, the challenge creation interface suggests a new challenge based on user attributes. The system may retrieve demographic attributes describing the user, such as age, gender, location, school, employment, etc. from the user profile store. The system may retrieve user preference attributes, such as likes, favorites, recommendations, etc. The system may suggest a challenge based on the user attributes. For example, the system may determine that the user likes kung fu movies, and the system may suggest a challenge with the prompt, "Do your best kung fu move." In some embodiments, the system may identify user attributes of users connected to the user, and the system may suggest a challenge based on the connected user's attributes. For example, the system may determine that 50% of the user's connections work at the same company, and the system may suggest a challenge related to work, such as "Post a video of you sneaking out of work early."

The system receives 320 challenge parameters from a challenger. The challenge parameters may be received from the challenger via the challenge creation interface. The challenge parameters may comprise the challenge prompt. The challenge parameters may comprise the response format. For example, the response format may comprise text, audio, photo, video, some combination thereof, or the format may allow responders to use any format desired by the responder.

The challenge parameters may comprise the challenge duration. The challenge duration may comprise a start time, an end time, a time duration, or some combination thereof. For example, the challenge duration may indicate that the challenge ends on a specific time and date. The challenge duration may indicate that the challenge ends twelve hours from the time that the challenge is distributed to challengees. In some embodiments, the challenge duration may start for each challengee in response to an action by the challengee, such as the challengee logging into an account or viewing the challenge prompt. The challengee may have a fixed amount of time in response to the action by the challengee. For example, after viewing the challenge prompt, the challengee may have fifteen minutes to post a response to the challenge.

The challenge parameters may comprise an identification of the challengees. A default for the identification may be all contacts of the challenger. In some embodiments, the challenger may select a subset of the challenger's contacts, such as individuals or groups, to challenge. In some embodiments, a challengee may respond to a challenge with a re-challenge, and all challengees or challenge responders to the challenge may be identified as challengees for the re-challenge. For example, in response to receiving an initial challenge with the challenge prompt, "Sing your favorite rap song," a challenge responder may create a re-challenge with the challenge prompt, "sing your favorite rap song while eating peanut butter," and the re-challenge may be transmitted to all of the challenge responders to the initial challenge, regardless of whether they are contacts of the user submitting the re-challenge.

The system stores 330 a challenge record. The system may store the challenge record in the challenge store. The challenge record comprises the challenge parameters. The challenge record comprises a challenge status field indicating whether the challenge is complete. The challenge record includes a response status field for each challengee indicating whether the challengee has submitted a response to the challenge. The challenge record comprises a permission field for each challengee. The permission field indicates whether the challengee is permitted to view responses to the challenge. During the challenge duration, the permission field may be "no" for all challengees, which prevents any challengee from viewing challenge responses during the challenge duration. However, in some embodiments, the permission field may be changed to "yes" for a challengee in response to the challengee submitting a response, regardless as to whether the challenge duration has ended. In response to the end of the challenge duration, the challenge status field may be changed to complete. In response to the end of the challenge duration, the permission field may be changed to "yes" for each challengee who submitted a response to the challenge, which may allow the challenge responders to view the challenge responses submitted by other challenge responders. In some embodiments, in response to changing the challenge status field to complete, the challenge responses may be viewable by any user, including users who were not challenged.

The system transmits 340 a challenge response interface to the challengees. The challenge response interface may be presented to the challengees via a variety of methods. For example, the challenge response interface may be displayed in a newsfeed of the challengee. The challenge response interface may be displayed to a challengee in response to the challengee viewing a profile page of the challenger, or the challenge response interface may be transmitted via email, SMS message, or any other suitable manner. The system may store a timestamp of the time the challenge response interface was transmitted to, viewed by, or selected by the challengee.

The challenge response interface may provide various information to the challengee. The challenge response interface may display the challenge prompt, an identification of the challenger, an identification of challengees, an identity of challenge responders who have completed the challenge, an end time of the challenge, a thumbnail image of one or more responses to the challenge, or some combination thereof.

The system 350 receives a challenge response. The system may receive the challenge response via the challenge response interface. The system stores the challenge response in the challenge store. In response to receiving the challenge response, the system updates the challenge record to indicate that the challengee responded to the challenge. The system modifies the response status field for the challenge responder to indicate that the challenge responder has submitted a response to the challenge. The system stores each challenge response in the challenge store. The challenge store may link the challenge record with the stored challenge responses, such that, in response to a query by a user with permission to view challenge responses for a challenge, the system may retrieve the challenge responses.

The system 360 displays the challenge responses. In some embodiments, in response to a challengee submitting a response to the challenge, the system may modify the permission field to allow the challenge responder to view challenge responses. In some embodiments, in response to the end of the challenge duration, the system may modify the permission field for each challengee who submitted a response to the challenge, such that the challenge responders have permission to view the challenge responses submitted by other challenge responders. In response to the end of the challenge duration, the system may update the challenge response interface for each challenge responder who submitted a response to the challenge. The challenge response interface is configured to display challenge responses to a user. In some embodiments, the updated challenge response interface may have additional capabilities enabled, such as a play button enabled to view challenge responses. In some embodiments, the updated challenge response interface may display challenge responses in full resolution which were previously displayed blurred or grayed out in the challenge response interface. In some embodiments, the system may update the challenge response interface within the newsfeed. In some embodiments, the system may present the updated challenge response interface as a new content item in the newsfeed.

In some embodiments, the challenge response interface may allow a user to scroll through the challenge responses. The challenge response interface may be located within a vertical scroll of content items. The user may scroll horizontally on the challenge response interface to view the different challenge responses. In some embodiments, the challenge responses may be played sequentially in response to the user requesting to view the challenge responses.

In some embodiments, the challenge response interface may provide viewing users the opportunity to give feedback on a challenge response. For example, the viewing user may vote for a challenge response, rate a challenge response, comment on a challenge response, or perform any other action able to be performed with content items in the system. In some embodiments, the system may sort the order of challenge responses based on the feedback. For example, challenge responses with the most votes may be displayed first to users viewing challenge responses.

Figure 4:
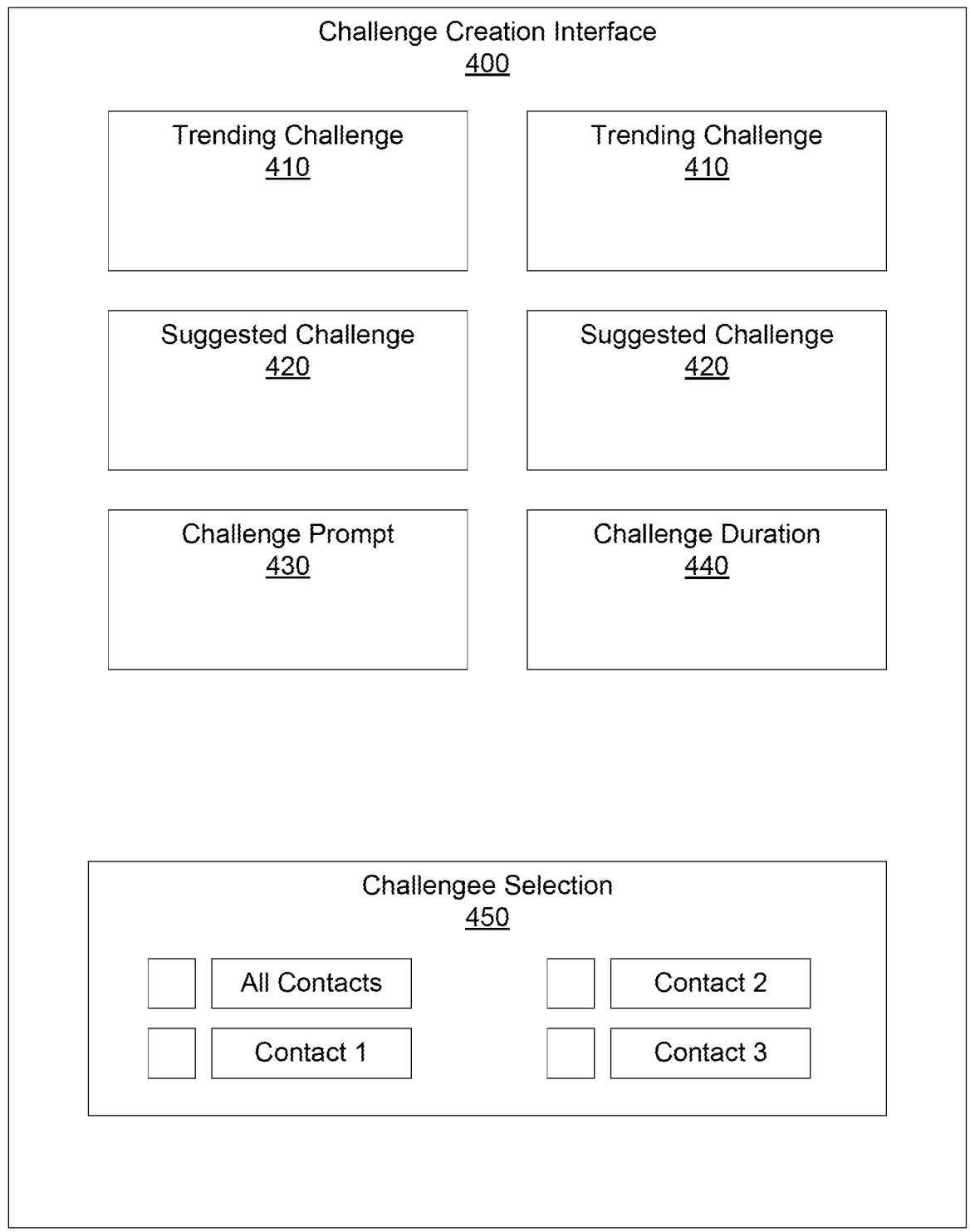
FIG. 4 is a challenge creation interface, in accordance with an embodiment.

FIG. 4 illustrates challenge creation interface 400, in accordance with one or more embodiments. A challenger may access the challenge creation interface 400 by a variety of methods, such as by selecting a "create challenge" button in a user profile page or a newsfeed of the challenger. The challenge creation interface 400 comprises one or more trending challenges 410. The trending challenges 410 may display the challenge prompt and a number of times the trending challenge 410 has been completed. The challenger may select one of the trending challenges 410 to create a new challenge with the parameters of the trending challenge. The challenge creation interface 400 may comprise one or more suggested challenges 420 based on user attributes. The suggested challenges 420 may be suggested based on user attributes of the challenger, user attributes of contacts of the challenger, or some combination thereof. The challenger may select one of the suggested challenges 420 to create a new challenge with the parameters of the suggested challenge 420. The challenge creation interface 400 comprises a challenge prompt field 430. The challenger may enter a custom challenge prompt in the challenge prompt field 430. The challenge creation interface 400 comprises a challenge duration field. The user may enter a challenge duration n the challenge duration field 440, such as an end time or a time duration for the challenge. The challenge creation interface 400 comprises a challengee selection field 450. The challengee selection field 450 is configured to allow the challenger to select other users to challenge. In some embodiments, the challengee selection field 450 may comprise a drop-down list, a selectable button for each of a user's contacts, a field to type in a contact's name, etc. In some embodiments, the challengee selection field 450 may comprise a select all contacts option. In some embodiments, in response to the user selecting a trending challenge 410 or a suggested challenge 420, the challenge creation interface 400 may auto-populate at least one of the challenge prompt field 430, the challenge duration field 440, or the challengee selection field 450.

Figure 5:
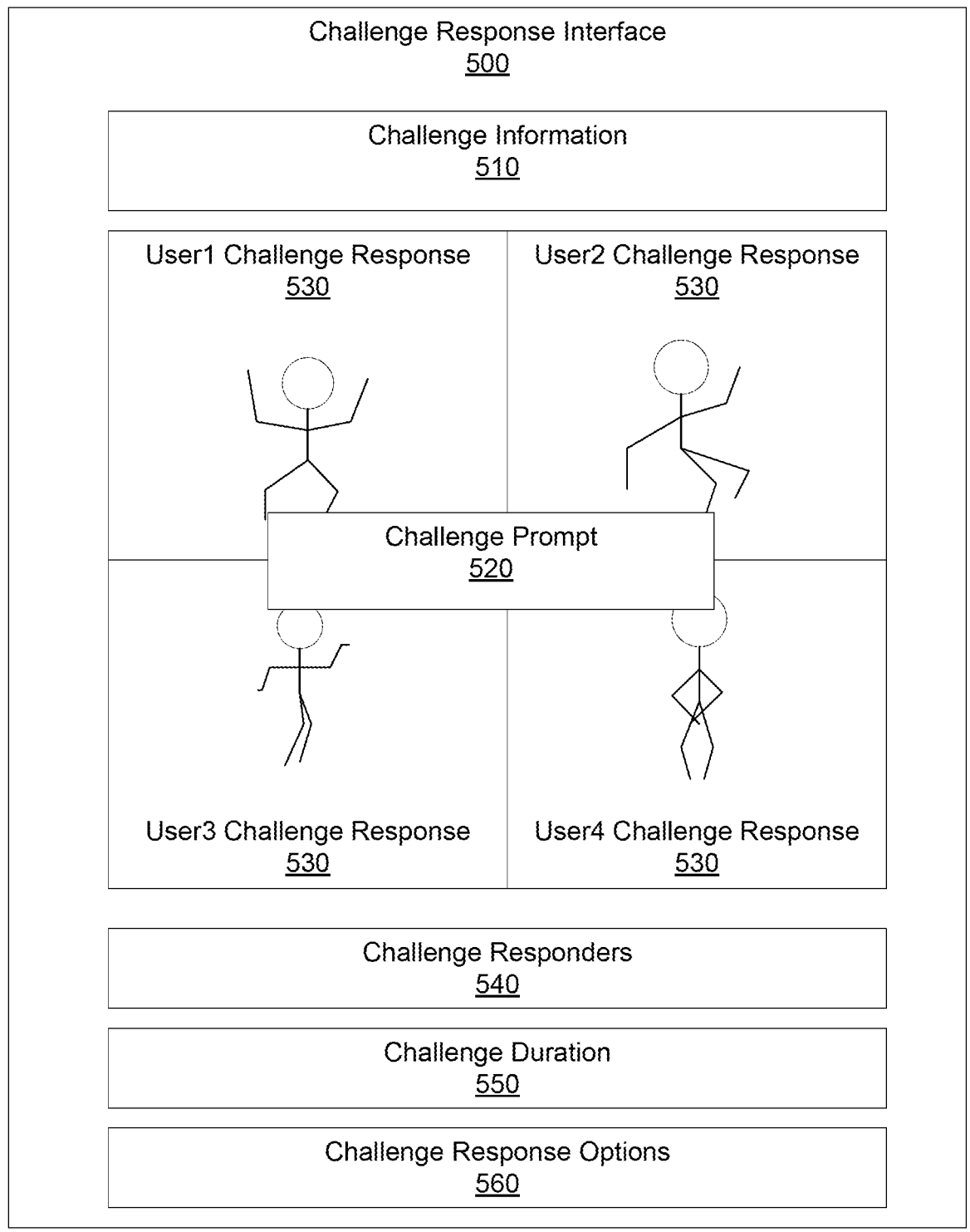
FIG. 5 is a challenge response interface, in accordance with an embodiment.

FIG. 5 illustrates a challenge response interface 500 in accordance with one or more embodiments. The challenge response interface 500 is configured to prompt a user to submit a response to a challenge. The challenge response interface 500 is also configured to display challenge responses to a user. The challenge response interface 500 may comprise challenge information 510. The challenge information 510 may display an identity of the creator of the challenge, as well as the identities of users being challenged. The challenge response interface 500 may comprise a challenge prompt 520. For example, the challenge prompt 520 may recite, "Dance in a public space for sixty seconds." In some embodiments, the challenge response interface 500 does not display the challenge prompt 520, and the challenge prompt 520 may be made available after the user completes an action, such as selecting a prompt video or submitting a response.

The challenge response interface 500 may comprise one or more challenge responses 530. In some embodiments, one of the challenge responses 530 may be a response submitted by the creator of the challenge. In some embodiments, the challenge responses 530 may provide a visual indication that the user does not have permission to view the challenge responses 530. For example, the challenge responses 530 may be compressed to a low resolution, in black in white, include an icon indicating no permission, or some combination thereof. For challenge responses 530 including a video, the challenge response 530 may comprise a still frame from the video. Although shown with four challenge responses 530, in other embodiments the challenge response interface 500 may comprise any suitable number of challenge responses 530. For example, the challenge response interface 500 may display all completed challenge responses 530 up to a limit of challenge responses 530 for the challenge response interface 500. The limit may depend on the type of device viewing the challenge response interface 500. For example, the limit for a mobile device may be four challenge responses 530, and the limit for a laptop computer may be twelve challenge responses.

The challenge response interface 500 may comprise a challenge responders list 540. The challenge responders list 540 may identify the users that have previously responded to the challenge. In some embodiments, the challenge responders list 540 may comprise an image and/or a name of each user that has responded to the challenge. The challenge response interface 500 may comprise a challenge duration 550. The challenge duration 550 may indicate to the user the time at which the challenge ends, as well as whether the challenge is still active.

The challenge response interface 500 may comprise challenge response options 560. The challenge response options 560 provide available actions for the user. For example, the user may select a photo or video stored on the user device, or the user may select an option to capture a new image or video. The challenge response options 560 allow the user to submit a response to the challenge. The challenge response options 560 may provide the user with the option to like, comment, share, or perform any other suitable action with the challenge response interface. In response to the user submitting a response to the challenge, the appearance of the challenge responses 530 may change, indicating that the user has permission to view the challenge responses 530. For example, the challenge responses 530 may change from black and white to color, may increase the resolution, may display a play button, may start playing or scrolling automatically, or some combination thereof. In some embodiments, the user may scroll horizontally on the challenge responses 530 to view additional submitted challenge responses.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   generating, by a processor, a challenge creation interface;
   receiving, by the processor, challenge parameters via the challenge creation interface;
   creating, by the processor, a challenge record comprising the challenge parameters, wherein the challenge parameters comprise a challenge duration;
   transmitting, by the processor, a challenge response interface to a challenged user, wherein the challenge response interface is presented to the challenged user in a newsfeed of a social networking system;
   transmitting, by the processor, a plurality of challenge responses submitted by other users to the challenged user;
   receiving, by the processor and from the challenged user, a challenge response via the challenge response interface, where one or more of the challenge responses comprises video content created by the challenged user;
   maintaining, by the processor, a permission field for the challenged users during an entirety of the challenge duration, where the permission field prevents each of the challenged users from viewing the challenge responses during the entirety of the challenge duration;
   modifying, by the processor, a permission field to view any of the plurality of challenge responses for the challenged user in response to an end of the challenge duration and based on receiving the challenge response;
   transmitting, by the processor, in response to the modified permission field the plurality of challenge responses to the challenged user to be displayed to the challenged user including the challenge response, wherein the plurality of challenge responses are presented as a new content item in the newsfeed of the challenged user;
   displaying, by the processor, the plurality of challenge responses via a response viewing interface in a newsfeed of the challenged user; and
   transmitting, by the processor, the plurality of challenge responses including the challenge response to the other users submitting the plurality of challenge responses to be displayed to the other users.

2. The method of claim 1, wherein the challenge parameters comprise a challenge prompt and an identification of challenged users.

3. The method of claim 1, further comprising modifying, by the processor, the permission field for the challenged user in the challenge record based on receiving the challenge response.

4. The method of claim 1, further comprising storing, by the processor, the plurality of challenge responses in association with the challenge record.

5. The method of claim 1, further comprising suggesting, by the processor and via the challenge creation interface, a trending challenge.

6. The method of claim 1, further comprising transmitting, by the processor, the challenge response interface to the challenged user via a newsfeed of the challenged user.

7. A computer program product comprising a non-transitory computer-readable storage medium containing computer program code for:
   generating a challenge creation interface;
   receiving challenge parameters via the challenge creation interface;
   creating a challenge record comprising the challenge parameters, wherein the challenge parameters comprise a challenge duration;
   transmitting a challenge response interface to a challenged user, wherein the challenge response interface is presented to the challenged user in a newsfeed of a social networking system;
   transmitting a plurality of challenge responses submitted by other users to the challenged user;
   receiving, from the challenged user, a challenge response via the challenge response interface, where one or more of the challenge responses comprises video content created by the challenged user;
   maintaining a permission field for the challenged users during an entirety of the challenge duration, where the permission field prevents each of the challenged users from viewing the challenge responses during the entirety of the challenge duration;
   modifying, a permission field to view any of the plurality of challenge responses for the challenged user in response to an end of the challenge duration and based on receiving the challenge response;
   transmitting in response to the modified permission field the plurality of challenge responses to the challenged user to be displayed to the challenged user including the challenge response, wherein the plurality of challenge responses are presented as a new content item in the newsfeed of the challenged user;
   displaying the plurality of challenge responses via a response viewing interface in a newsfeed of the challenged user; and transmitting the plurality of challenge responses including the challenge response to the other users submitting the plurality of challenge responses to be displayed to the other users.

8. The computer program product of claim 7, wherein the challenge parameters comprise a challenge prompt and an identification of challenged users.

9. The computer program product of claim 7, further containing computer program code for modifying the permission field for the challenged user in the challenge record based on receiving the challenge response.

10. The computer program product of claim 7, further containing computer program code for storing the plurality of challenge responses in association with the challenge record.

11. The computer program product of claim 7, further containing computer program code for suggesting, via the challenge creation interface, a trending challenge.

12. The computer program product of claim 7, further containing computer program code for transmitting the challenge response interface to the challenged user via a newsfeed of the challenged user.

13. A computer program product comprising a non-transitory computer-readable storage medium containing computer program code that comprises:
  a challenge creation module configured to:
    generate a challenge creation interface;
    receive challenge parameters via the challenge creation interface, wherein the challenge parameters comprise a challenge duration; and
    create a challenge record comprising the challenge parameters; and
  a challenge response module configured to:
    transmit a challenge response interface to a challenged user, wherein the challenge response interface is presented to the challenged user in a newsfeed of a social networking system;
    transmit a plurality of challenge responses submitted by other users to the challenged user;
    receive, from the challenged user, a challenge response via the challenge response interface, where one or more of the challenge responses comprises video content created by the challenged user;
    maintain a permission field for the challenged users during an entirety of the challenge duration, where the permission field prevents each of the challenged users from viewing the challenge responses during the entirety of the challenge duration;
    modify a permission field to view any of the plurality of challenge responses for the challenged user in response to an end of the challenge duration and based on receiving the challenge response;
    transmit in response to the modified permission field the plurality of challenge responses to the challenged user to be displayed to the challenged user including the challenge response, wherein the plurality of challenge responses are presented as a new content item in the newsfeed of the challenged user;
    display the plurality of challenge responses via a response viewing interface in a newsfeed of the challenged user; and
    transmit the plurality of challenge responses including the challenge response to the other users submitting the plurality of challenge responses to be displayed to the other users.

14. The computer program product of claim 13, wherein the challenge parameters comprise a challenge prompt and an identification of challenged users.

15. The computer program product of claim 13, wherein the challenge creation module is further configured to modify the permission field for the challenged user in the challenge record based on receiving the challenge response.

16. The computer program product of claim 13, wherein the challenge response module is further configured to store the plurality of challenge responses in association with the challenge record.

17. The computer program product of claim 13, wherein the challenge creation module is further configured to suggest, via the challenge creation interface, a trending challenge.

18. The computer program product of claim 13, wherein the challenge response module is further configured to transmit the challenge response interface to the challenged user via a newsfeed of the challenged user.

* * * * *